US005650844A

United States Patent [19]
Aoki et al.

[11] Patent Number: 5,650,844
[45] Date of Patent: Jul. 22, 1997

[54] LCD PANEL IMAGE QUALITY INSPECTION SYSTEM AND LCD IMAGE PRESAMPLING METHOD

[75] Inventors: Hiroyuki Aoki, Gyoda; Yoshihisa Matsumura, Kohnosu, both of Japan

[73] Assignee: Advantest Corporation, Tokyo, Japan

[21] Appl. No.: 502,578

[22] Filed: Jul. 14, 1995

[30] Foreign Application Priority Data

Jul. 14, 1994 [JP] Japan .................................. 6-185483

[51] Int. Cl.⁶ .................................................. G01N 21/00
[52] U.S. Cl. ................................... 356/237; 348/180
[58] Field of Search .......................... 356/237; 345/904, 345/1, 3, 55, 84, 87; 348/181, 183, 184; 368/28, 29, 30, 62, 82, 84, 223, 239, 242; 358/139

[56] References Cited

U.S. PATENT DOCUMENTS 5,351,201  9/1994  Harshbarger et al. ............ 364/551.01

*Primary Examiner*—Frank Font
*Assistant Examiner*—Michael P. Stafira
*Attorney, Agent, or Firm*—Knobbe, Martens, Olson & Bear, LLP

[57] ABSTRACT

The contrast of an LCD panel is accurately measured with a small number of CCD pixels when measuring the LCD panel using a CCD camera. Therefore, a CCD area sensor is used in the CCD camera in this invention. An LCD driver section displays a calibration pattern or test patterns on the LCD panel to be inspected. An image measuring section performs A/D conversion on the contrast detected by the CCD pixels, and a CCD address setting means of the LCD pixels specifies the positions of the LCD pixels and the positions of the corresponding CCD pixels using luminescent spots of a calibration pattern. The address setting means determines the sampling addresses of each of the LCD pixels from the addresses of the luminescent spots using real number calculations. A presampling processing means converts the measured image to an image with the same number of pixels as the pattern on the LCD panel by means of linear interpolation.

4 Claims, 3 Drawing Sheets

SOUGHT ADDRESS

Brightness Data

Area

FIG. 5A
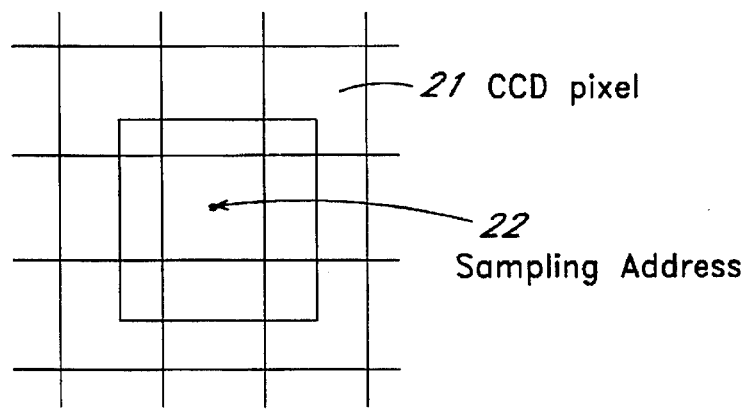
FIG. 5B
Brightness Data
| $d_a$ | $d_b$ | $d_c$ |
|---|---|---|
| $d_d$ | $d_e$ | $d_f$ |
| $d_g$ | $d_h$ | $d_i$ |
FIG. 5C
Area
FIG. 6
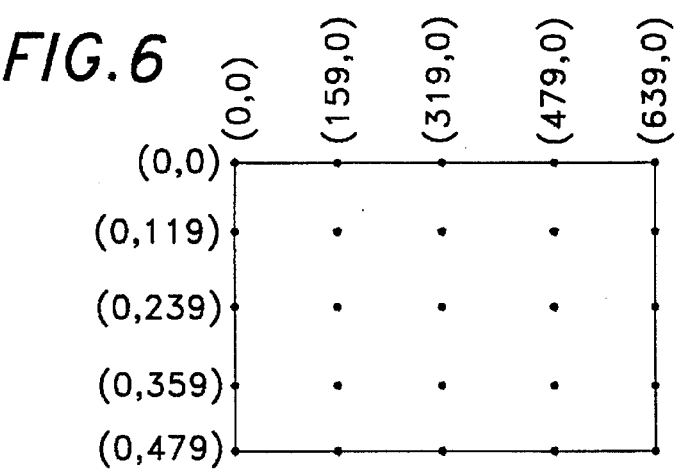

LCD PANEL IMAGE QUALITY INSPECTION SYSTEM AND LCD IMAGE PRESAMPLING METHOD

FIELD OF THE INVENTION

The present invention relates to a liquid crystal display (LCD) panel image quality inspection system and an LCD image presampling method that determines the center positions of pixels of a charged coupled device (CCD) which correspond to the positions of LCD panel pixels; measures the brightness at each determined center position of the CCD pixels corresponding to the LCD panel pixels and their peripheries; creates an LCD image; and thereby detects LCD panel defects.

BACKGROUND OF THE INVENTION

When measuring the contrast of pixels of an LCD panel inspected using a CCD camera, it is important to detect pixels of an inspected LCD panel so that there are a small number of corresponding pixels on the detecting CCD in order to provide an inexpensive, accurate and suitable inspection system for use in a production line.

According to conventional methods, matching the positions of pixels on the LCD panel with pixels on the CCD camera is performed as follows:

1. A calibration pattern for matching the pixel position shown in FIG. 6 is displayed on the LCD panel as a luminescent spot;
2. The contrast of the LCD pixels is measured by defining a unit, comprising multiple CCD pixels upon which the luminescent spot impinges, and setting the center CCD pixel of the unit to correspond to the center of the LCD pixel;
3. The center positions of all of the LCD pixels are calculated and defined to correspond to the addresses of the CCD pixels using integer values (with reference to the addresses of the center pixels of the luminescent spots).
4. The contrast detected by the CCD pixels corresponding to the center of each of the LCD pixels on the LCD panel is measured and the positions of the LCD pixels are defined to correspond to the positions of the CCD pixels based upon the results of this measurement. In order to specify the positions of the LCD pixels by the above-described method, a number of CCD pixels are defined to correspond to a single LCD pixel (for example, 36 CCD pixels correspond to a single LCD pixel).

SUMMARY OF THE INVENTION

The following problems exist in the conventional method described above:

(1) A high density of CCD pixels is required, a high volume of measured data is required and the associated data processing time is great;

(2) The cost increases due to the high density of CCD pixels.

The objective of this invention is to measure the contrast of a LCD panel to be inspected accurately with a low density of CCD pixels (i.e., a small number of pixels per unit area relative to the number of pixels per unit area of the LCD screen) when measuring the LCD panel using the CCD camera.

In order to achieve this objective, a CCD area sensor is used in the CCD camera. An LCD driver section displays a calibration pattern or test patterns on the LCD panel to be inspected. An image measuring section performs A/D conversion on the contrast measured by the CCD pixels and a CCD address setting means of the LCD pixels is used to specify the positions of the LCD pixels and corresponding CCD pixels using a recognition pattern (such as the luminescent spots of the above-described calibration pattern). The CCD address setting means also determines the sampling addresses of each of the LCD pixels from the above recognition pattern of the CCD addresses using real numbers. A presampling processing means converts an LCD pattern to an image on the CCD with the same number of pixels as the LCD panel by means of linear interpolation using the above-measured sampling addresses. A defect determination means determines defects in the LCD screen based upon the contrast data measured for each LCD pixel. Control and display sections are provided to perform the aforementioned processing steps.

The LCD image presampling method begins by first displaying the calibration pattern as luminescent spots on the LCD panel to be inspected. The contrast of the luminescent spots is measured by multiple CCD pixels. The maximum brightness detected by CCD pixels in the neighborhood of the luminescent spot images is determined. The center positions of the luminescent spots are computed by real numbers by considering the brightness of the adjacent pixels in the longitudinal and lateral directions from the center CCD pixel. Sampling addresses representing the addresses of the CCD pixels corresponding to each of the LCD panel pixels is calculated using real numbers. The measured image is converted to an image having the same number of pixels as the LCD panel by performing linear interpolation on the neighboring 4 or 9 pixels using the above sampling addresses after measuring the image of the presampled LCD panel using the CCD.

BRIEF DESCRIPTION OF THE DRAWINGS

FIGS. 5a–5c illustrate the method used to measure the contrast of the LCD pixels on nine adjacent pixels using linear interpolation.

FIG. 6 is a diagram showing the addresses of the luminescent spots on the calibration pattern.

DETAILED DESCRIPTION OF THE PREFERRED EMBODIMENT

The embodiment of this invention is explained by referring to the figures.

The following steps are carried out in order to measure the contrast of the CCD pixels, corresponding to the LCD pixels, and create the LCD image.

(1) The addresses of the LCD pixels and the CCD pixels corresponding to the LCD pixels are specified as indicated below.

First, the calibration pattern is displayed on the LCD (which, for example, comprises a 640×480 pixel screen).

Figure 2:
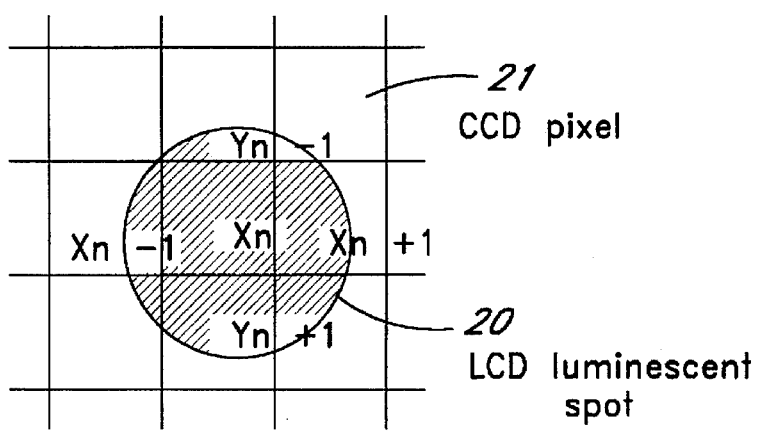
FIG. 2 is a diagram describing the method for detecting the LCD luminescent spots using the CCD pixels.

The calibration pattern has 25 luminescent spots displayed at the addresses of the LCD pixels shown in FIG. 6. In one embodiment, an array of 3×3 (for a total of 9 CCD pixels) is used to measure the contrast of each illuminated pixel on the LCD (using, for example, a CCD area sensor with 1534×1024 pixels). The luminescent spot of the LCD impinges on the surface of the CCD as an image shown in FIG. 2.

The following method is used in order to accurately determine the addresses of the luminescent spots.

The maximum contrast value is measured for each pixel in the neighborhood of the luminescent spots formed as an image on the CCD. The pixel registering the maximum contrast is defined as the center of the pixels.

Figure 3A:
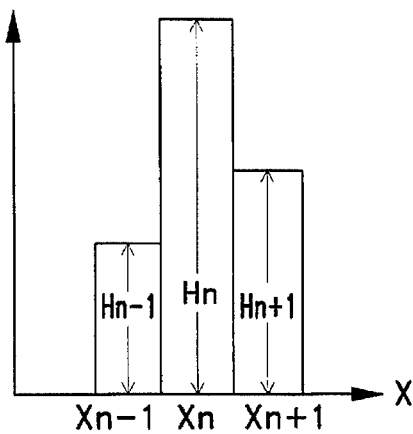
FIGS. 3a–3b are diagrams showing the method of determining the X-coordinate addresses of the luminescent spots.
Figure 3B:
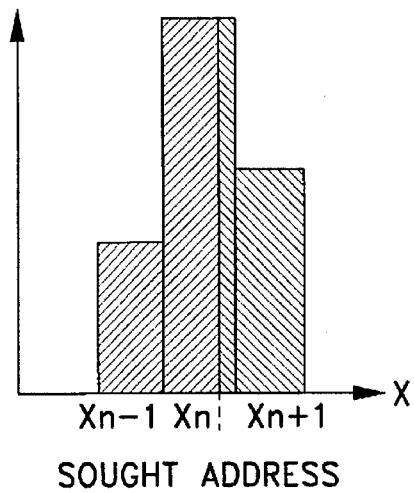

As shown in FIG. 3 (a), the center pixel is denoted as "$X_n$". It should be noted that the measured value for the contrast of the adjacent pixels $X_{n-1}$ and $X_{n+1}$ is also taken to determine the exact X-coordinate of the center of the luminescent spot. A line that divides the hatched area of FIG. 3 (b) into equal areas is the center address calculated along the X-coordinate. The formula is expressed as follows.

Addresss sought in the X direction=$X_n+(H_{n+1}-H_{n-1})/2H_n$

By carrying out the same computation for the Y coordinate, the address of the exact center of the luminescent spots is found. By performing this operation for all 25 spots, the CCD addresses for the luminescent spots of the 25 LCD pixels in the X and Y directions can be calculated.

(2) The sampling addresses of the entire LCD pixels are defined.

The image received in the calibration pattern is divided into 16 domains with the luminescent spots forming a square. For each domain the addresses of the CCD measuring pixels corresponding to the pixels of the LCD panel contained in the domain are calculated using real numbers. This calculation is derived from the relationship between the addresses of the squares (i.e., of luminescent spots) and the pixel address of the LCD panel at the luminescent spots. By this operation, the sampling addresses are defined, which represent the addresses of the CCD pixels corresponding to the addresses of the LCD pixels.

(3) Convert to an image with the pixel size of the LCD panel by the presampling process.

The image on the LCD panel to be presampled is measured by the CCD. The measured pixels are converted to an image with the same pixel size as the LCD panel by liner interpolation on the neighboring 4 or 9 pixels using the previously found sampling addresses.

(4) Linear interpolation on the four neighboring pixels.

Figure 4A:
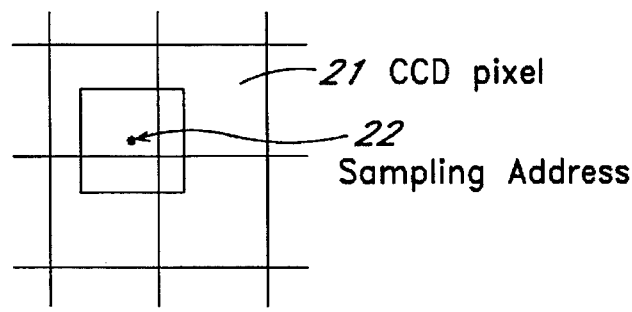
FIGS. 4a–4c illustrate the method used to determine the contrast of the detected LCD pixels on four adjacent pixels using linear interpolation.
Figure 4B:
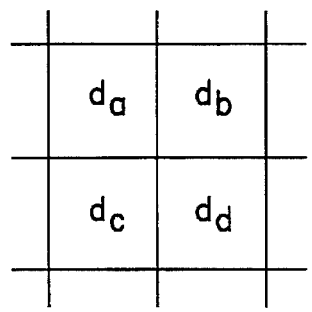
Figure 4C:
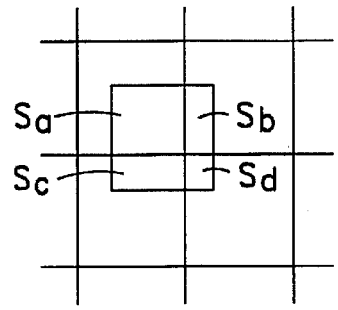

Consider a 1 pixel×1 pixel square with the sampling address 22 as its center as shown in FIG. 4 (a). This square falls in the image of four CCD pixels. As shown in FIG. 4 (b) and (c), the contrast data of each pixel and ratios of the overlapped areas of the squares in each pixel are computed. Multiplying the contrast values by the corresponding ratios, and adding them together yields the presampling value. This calculation is expressed as follows:

Presampling result=$da\times sa+db\times sb+dc\times sc+dd\times sd$ (5) Linear interpolation on the neighboring 9 pixels.

Consider a 2×2 (i.e., 2 pixels long by 2 pixels wide) square with the sampling address 22 as its center as shown in FIG. 5 (a). This square falls as an image in nine CCD pixels. As shown in FIG. 5 (b) and (c), the contrast data (i.e., the measured intensity) of each pixel and ratios of the overlapped areas of the squares in each pixel are computed. Multiplying the contrast values by the corresponding ratios, adding them together and dividing the summed value by 4 yields the presampling value.

Figure 1:
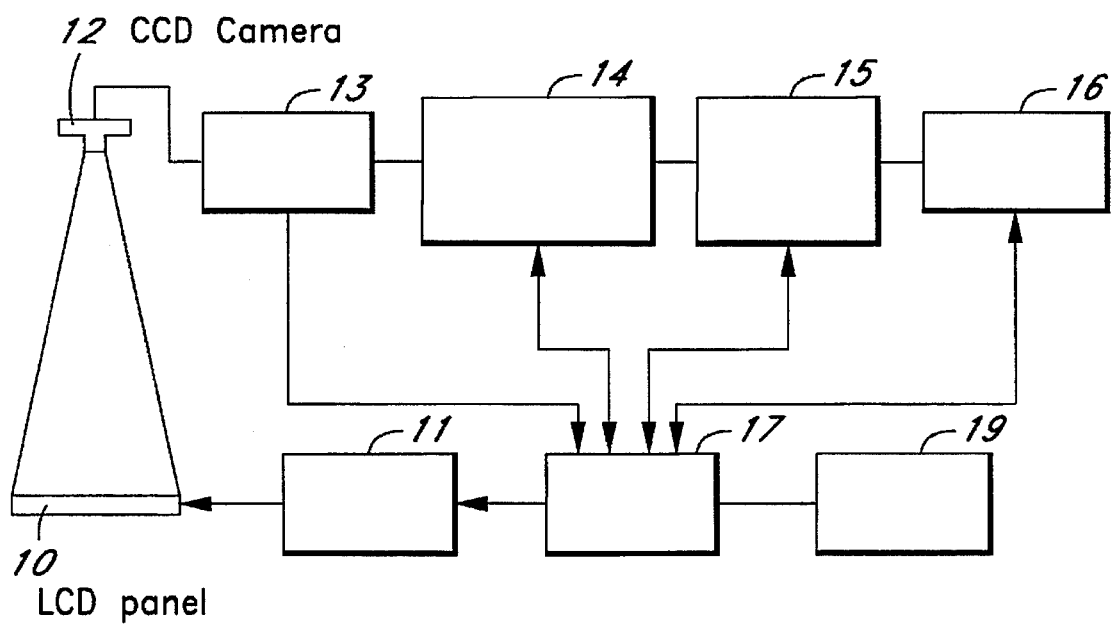
FIG. 1 is a block diagram of the LCD panel image quality inspection system constructed in accordance with the present invention.

FIG. 1 is a block diagram of the LCD panel image quality inspection system that performs the above LCD image presampling process. The LCD panel image quality inspection system, in accordance with the first embodiment of this invention, comprises: an LCD panel 10 to be inspected; an LCD panel driver section 11 that displays the calibration pattern and various test patterns on the LCD panel 10 to be inspected; a CCD camera 12 that has a built-in CCD area sensor and that measures the contrast of the LCD; an image measuring section 13 that converts the contrast signals measured by the CCD pixels into digital signals; a CCD address setting means 14 that specifies the positions of the LCD pixels and corresponding CCD pixels using the luminescent spots of the calibration pattern, and determines the sampling addresses of the entire LCD pixels from the CCD addresses of the luminescent spots; a presampling process means 15 that measures the image on the LCD panel using the CCD, linearly interpolates using the above sampling addresses, and converts the image to a screen with the same pixel size as the LCD panel; a defect determination means 16 that determines defects based on the contrast data measured for each LCD pixel obtained as an image of the LCD panel; a control section 17 that controls the overall method; and a display section 19 that displays the LDC image and a status of the control operation.

This invention has the following effects because it is structured as described above and because the image of the LCD panel is obtained by the method described above.

1) The data processing time is reduced due to the reduced number of measured CCD pixels.

2) The cost is reduced due to the low density of CCD pixels.

3) Because the positions of the LCD pixels are converted to the addresses of the CCD pixels not using integers but using real numbers, the measured results of multiple CCD pixels are added and the contrast of an image on the LCD panel can be measured more accurately.

We claim:

1. An image quality inspection system which is constructed to accurately measure image contrast, comprising:

an LCD driver section that displays a calibration pattern and test pattern on a LCD panel to be inspected;

a CCD camera having a built-in CCD area sensor for measuring the contrast of the pattern on the LCD;

an image measuring section which converts the contrast signals measured by the CCD pixels into digital signals;

a CCD address setter that specifies, in real number values, the position of the LCD pixels and corresponding CCD pixels using the calibration pattern, and which determines the sampling addresses of each of the LCD pixels in real numbers, said sampling address being determined based on a CCD pixel showing the highest brightness as a center pixel and adjacent pixels on both sides of said center pixel by seeking a point in said center pixel which makes average brightness in both sides of said point identical;

a presampling processor which measures the pattern on the LCD panel using the CCD, and which converts the pattern to an image with the same pixel size as the pattern on the LCD panel using linear interpolation, said linear interpolation being performed on 4 adjacent CCD pixels;

a defect determination device detects defects of the LCD panel based upon the measured contrast of each LCD pixel;

a control section; and a display section that displays the LCD image and a status of control operation.

2. An LCD image presampling method which measures image contrast accurately, comprising the steps of:

displaying a calibration pattern on an LCD panel to be inspected as a pattern of luminescent spots;

measuring a contrast of an image of said luminescent spots impinging on multiple CCD pixels;

seeking a maximum brightness in a vicinity of the luminescent spots of the measured image and computing a center position of the luminescent spots as a real number by considering the brightness of adjacent pixels in longitudinal and lateral directions with the pixel having the maximum brightness as a center;

determining a sampling address as a real number based on said center positions of the images of the luminescent spots;

converting the measured image to an image with the same number of pixels as the pattern on the LCD panel by performing linear interpolation on adjacent pixels using said sampling addresses, said linear interpolation being performed on 4 adjacent CCD pixels.

3. The LCD image presampling method in claim 2, wherein the linear interpolation is performed on 9 adjacent CCD pixels.

4. The image quality inspection system as defined in claim 1, wherein said linear interpolation is performed on 9 adjacent CCD pixels.

* * * * *